Dec. 13, 1960    B. A. PEARSON    2,964,459
STUD-PULLING CRANE
Filed May 29, 1956    17 Sheets-Sheet 1
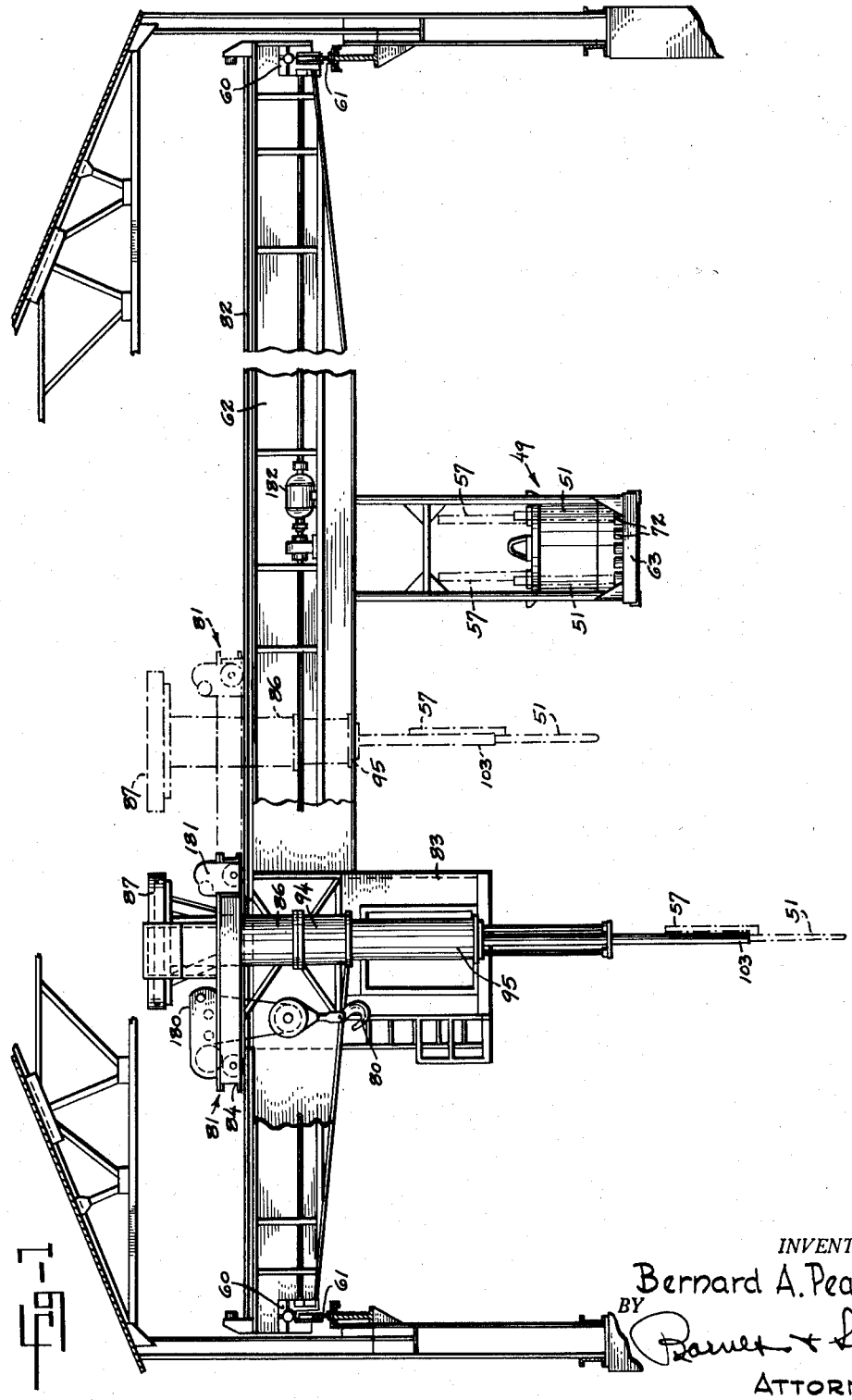
INVENTOR.
Bernard A. Pearson
BY
ATTORNEYS Dec. 13, 1960 B. A. PEARSON 2,964,459
STUD-PULLING CRANE
Filed May 29, 1956 17 Sheets-Sheet 2
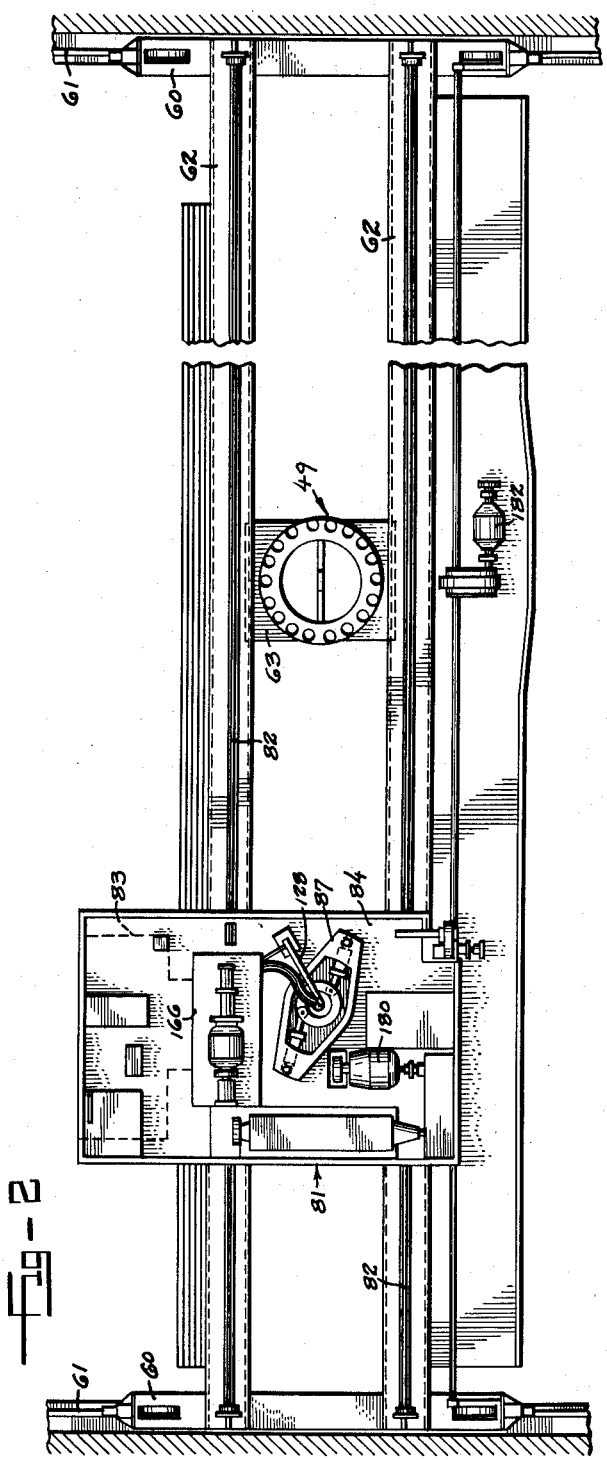
INVENTOR.
Bernard A. Pearson
ATTORNEYS

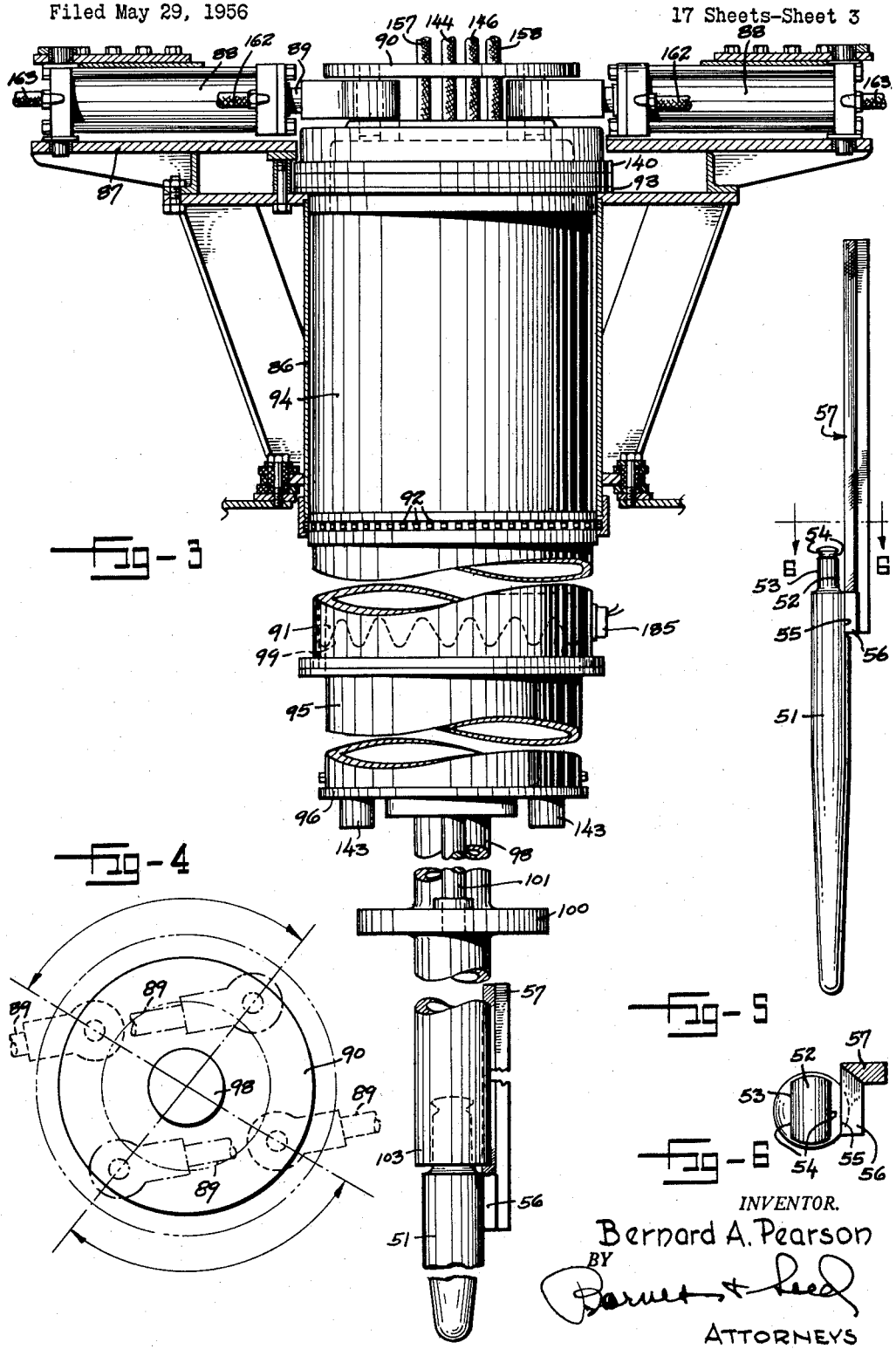

Dec. 13, 1960 B. A. PEARSON 2,964,459
STUD-PULLING CRANE
Filed May 29, 1956 17 Sheets-Sheet 4
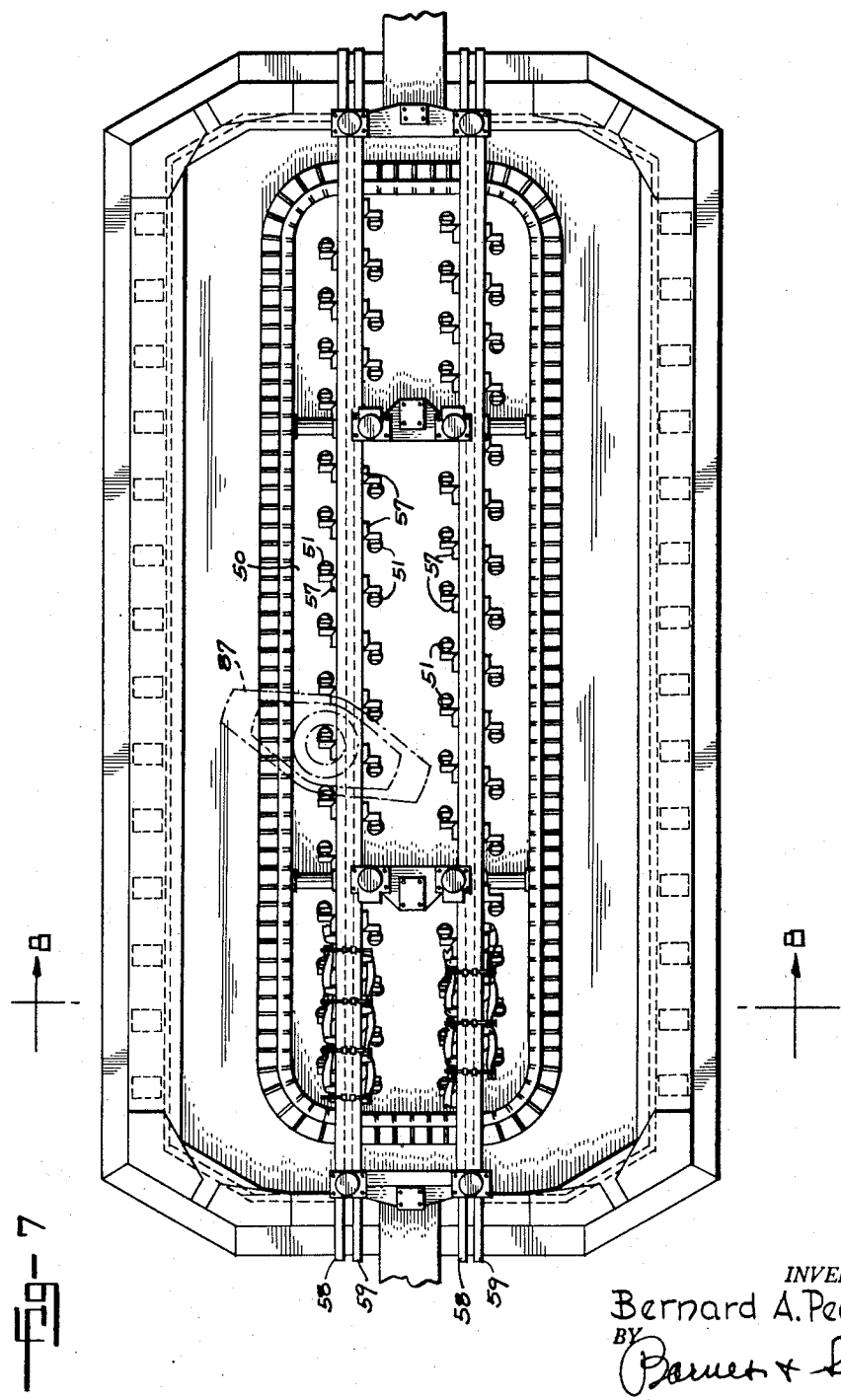

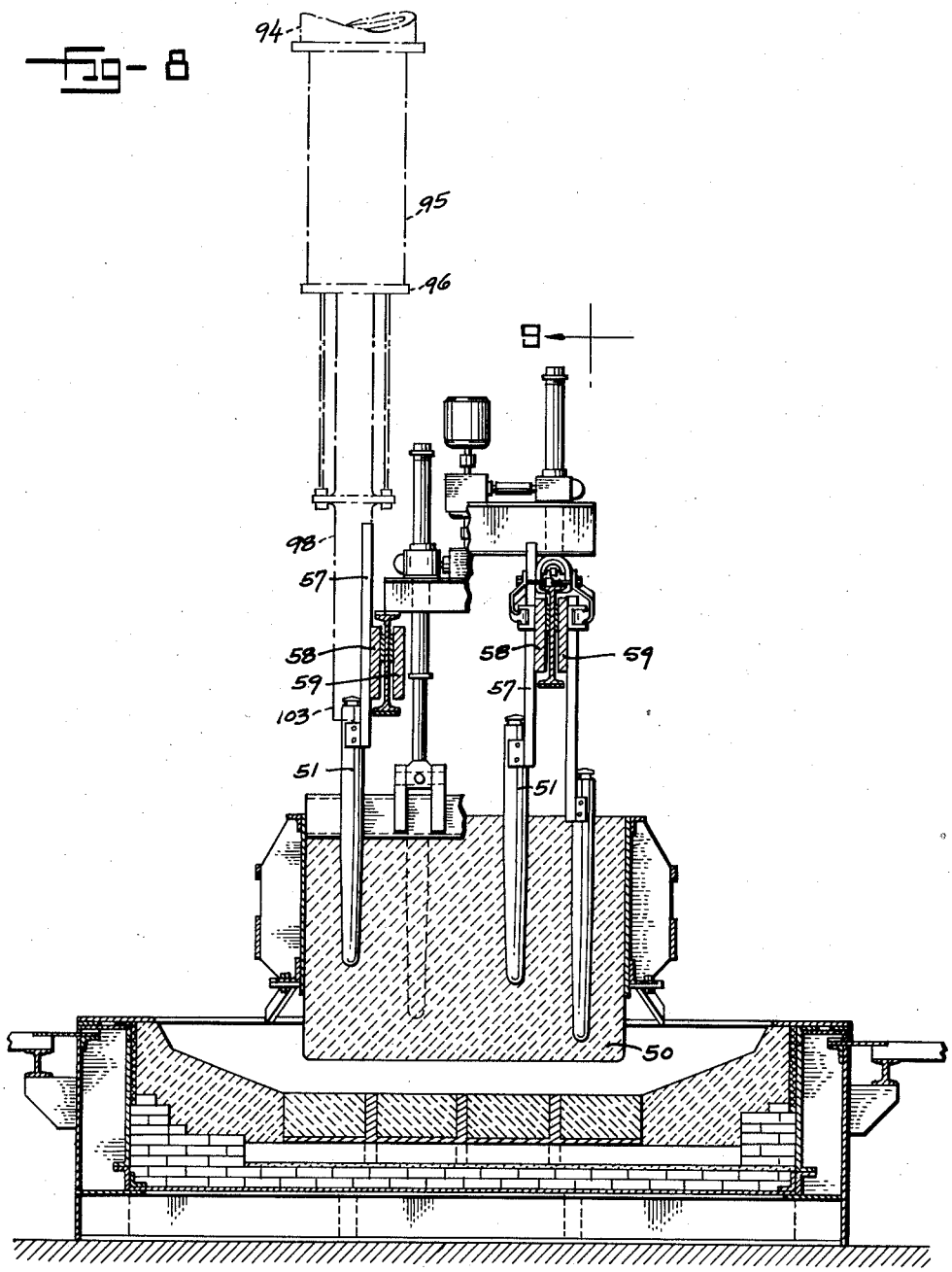

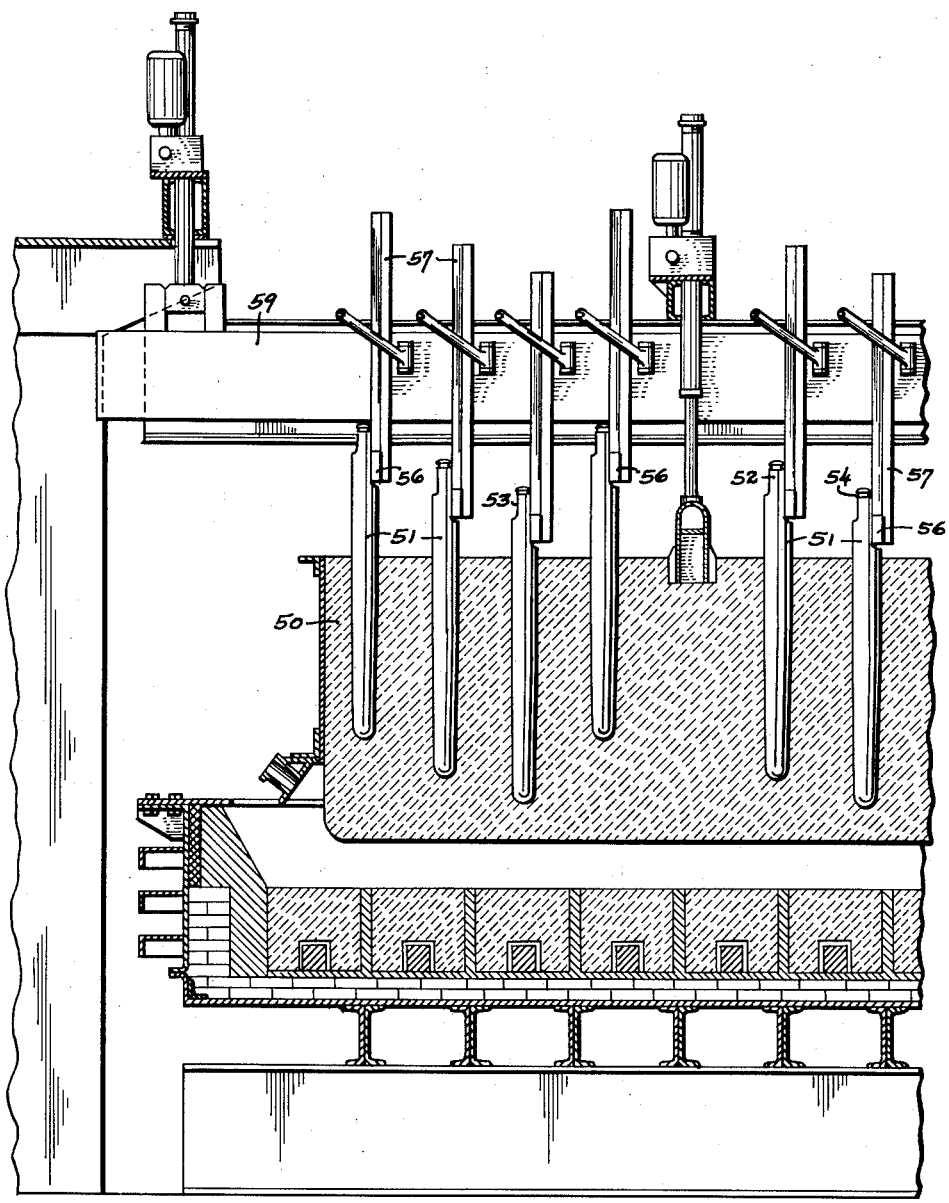

Dec. 13, 1960
B. A. PEARSON
2,964,459
STUD-PULLING CRANE
Filed May 29, 1956
17 Sheets-Sheet 7
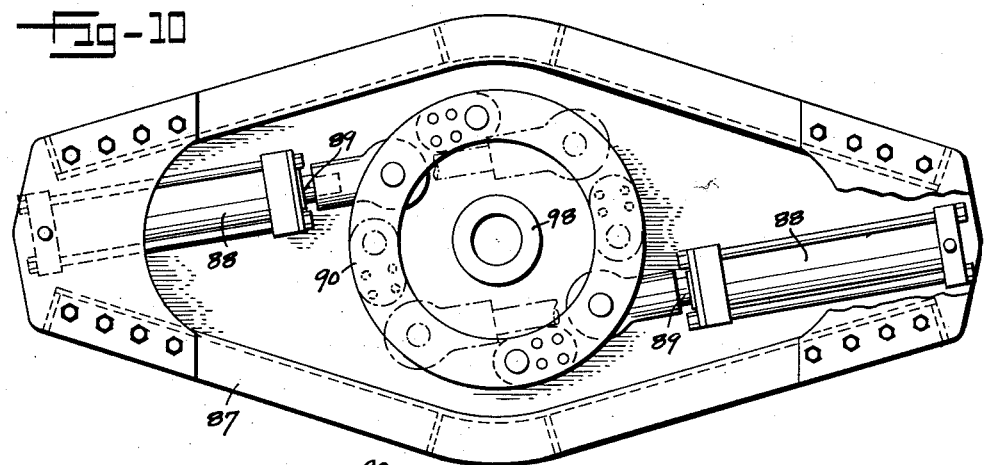
Fig-10
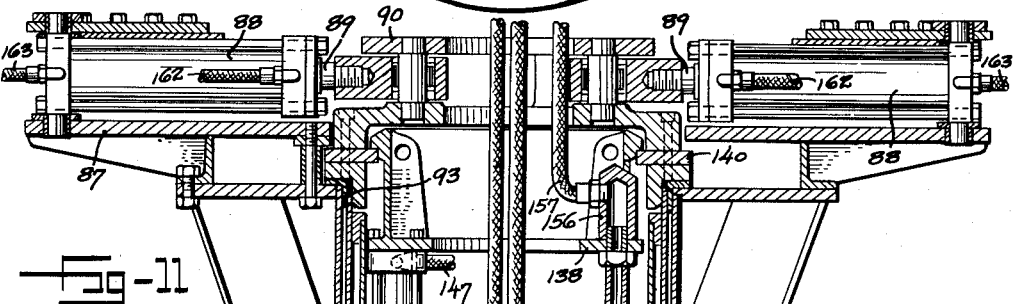
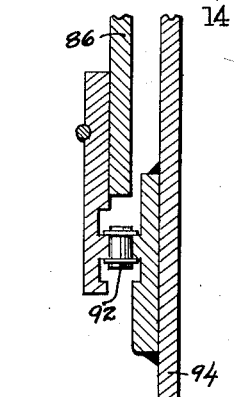
Fig-12
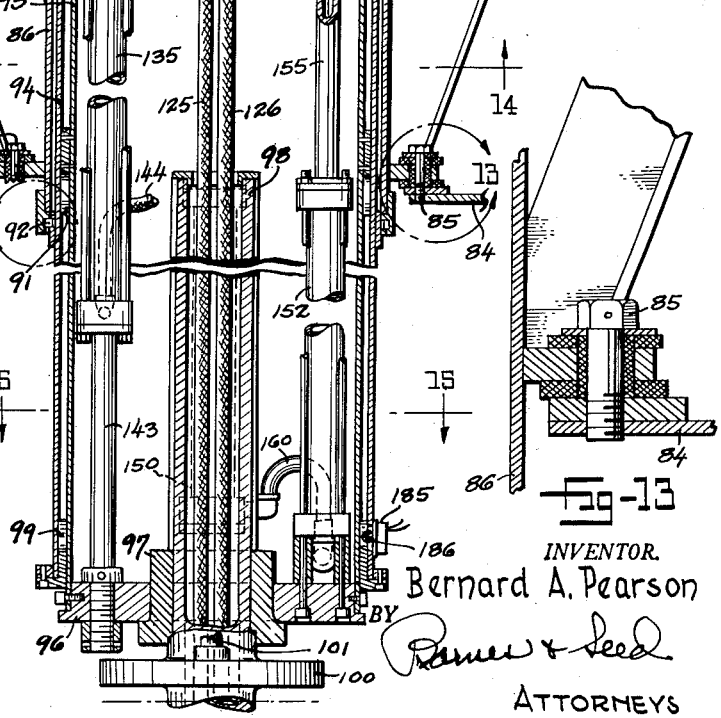
Fig-11
Fig-13
INVENTOR.
Bernard A. Pearson
BY
ATTORNEYS Dec. 13, 1960 B. A. PEARSON 2,964,459
STUD-PULLING CRANE
Filed May 29, 1956 17 Sheets-Sheet 8
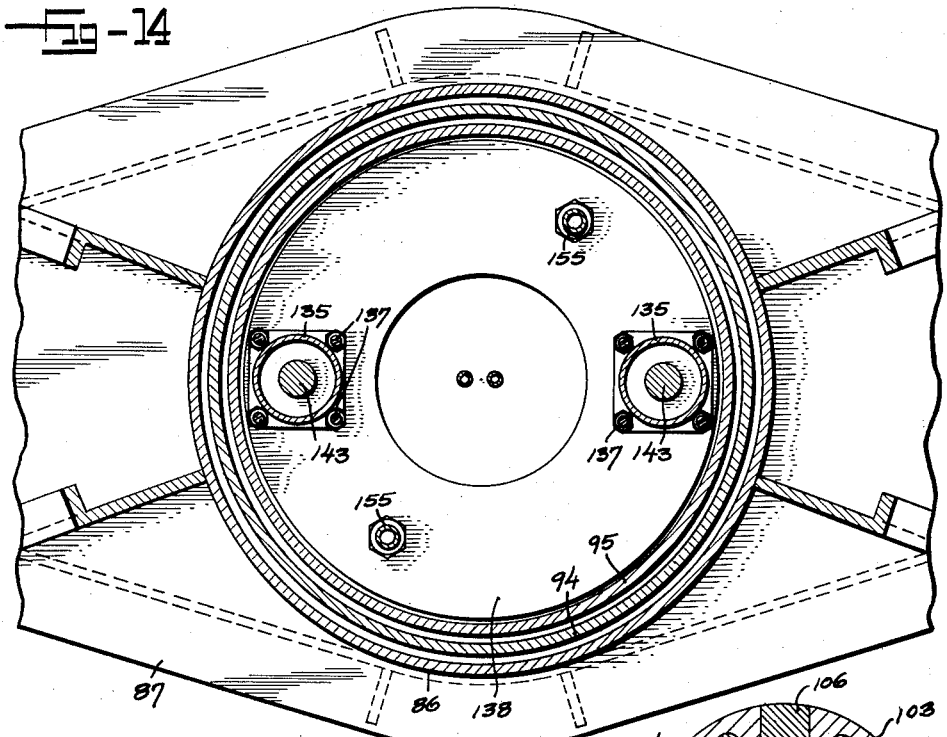
Fig-14
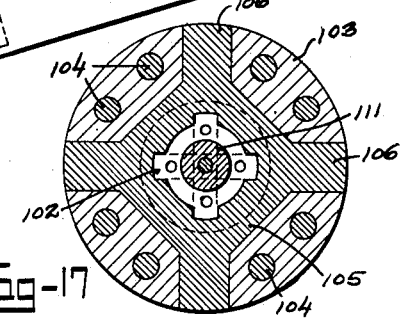
Fig-17
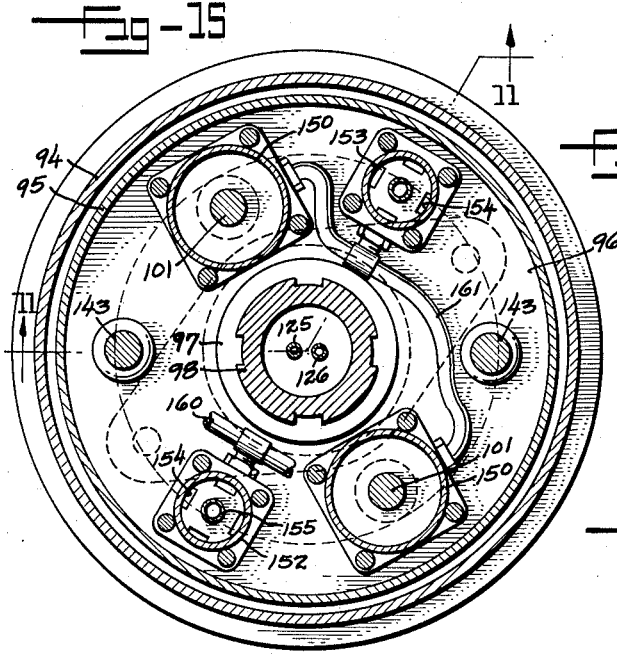
Fig-15
Fig-18
INVENTOR.
Bernard A. Pearson
BY
Barnet & Seed
ATTORNEYS Dec. 13, 1960  B. A. PEARSON  2,964,459
STUD-PULLING CRANE
Filed May 29, 1956  17 Sheets-Sheet 9
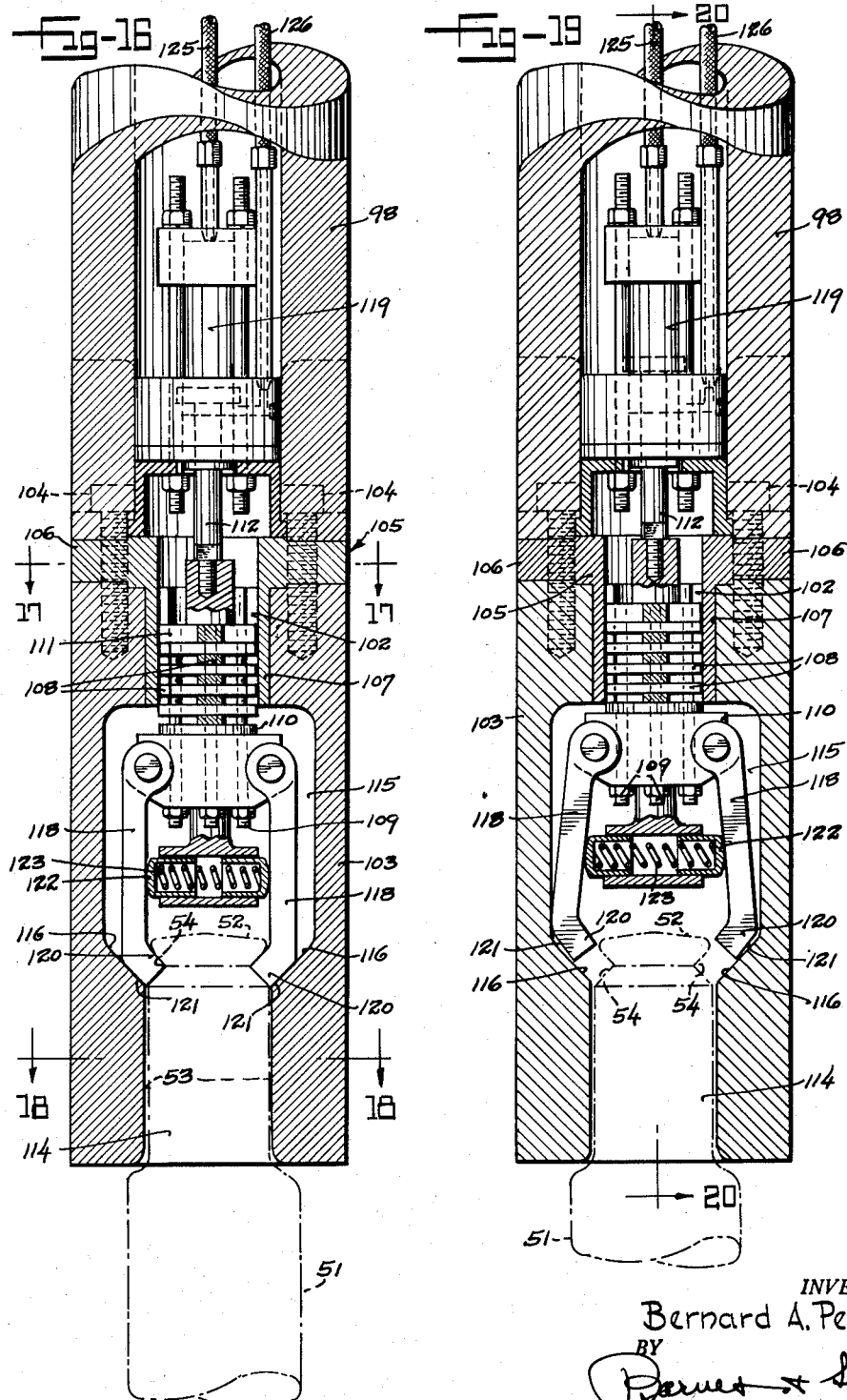
INVENTOR.
Bernard A. Pearson
BY
ATTORNEYS Dec. 13, 1960
B. A. PEARSON
2,964,459
STUD-PULLING CRANE
Filed May 29, 1956
17 Sheets-Sheet 10
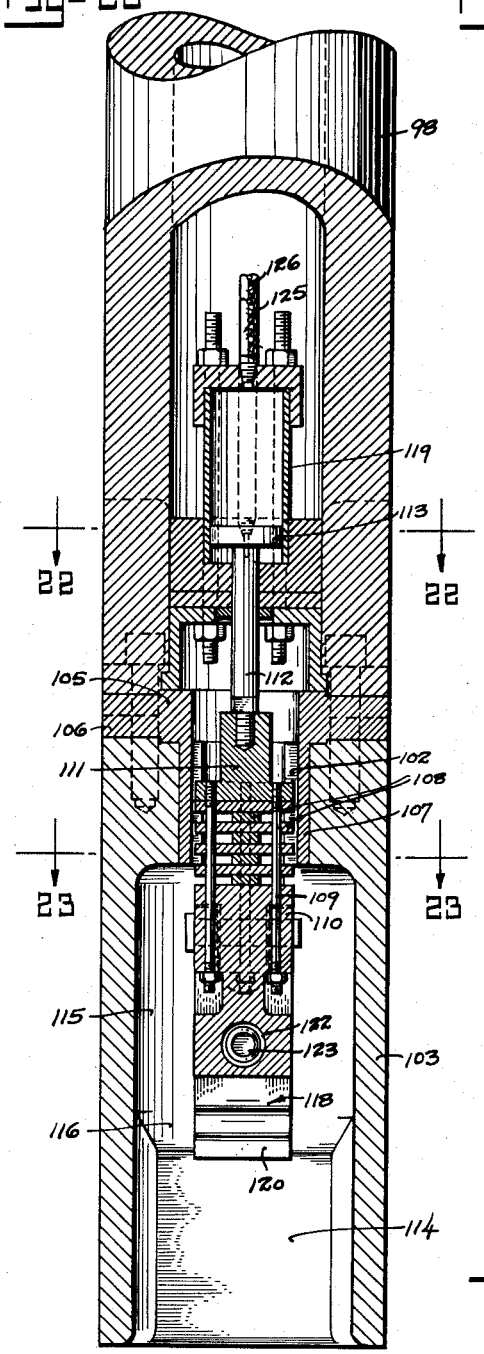
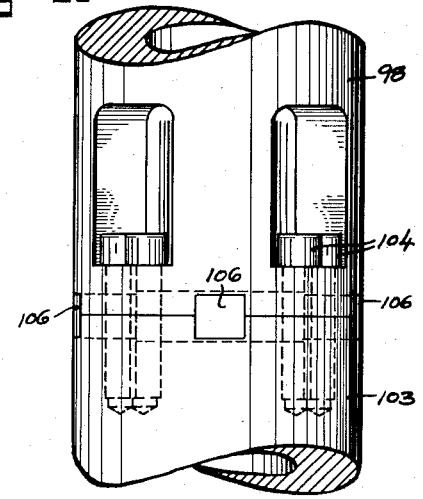
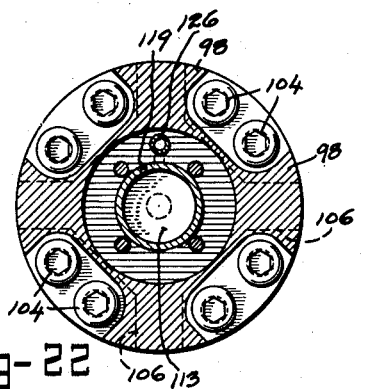
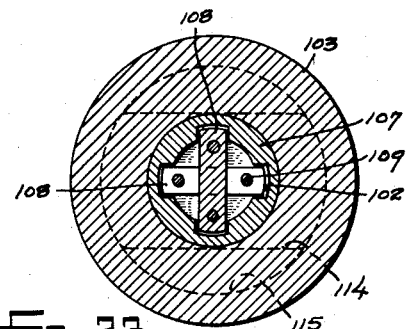
INVENTOR.
Bernard A. Pearson
BY
Barnes + Neal
ATTORNEYS Dec. 13, 1960 B. A. PEARSON 2,964,459
STUD-PULLING CRANE
Filed May 29, 1956 17 Sheets-Sheet 11

INVENTOR.
Bernard A. Pearson
BY
ATTORNEYS

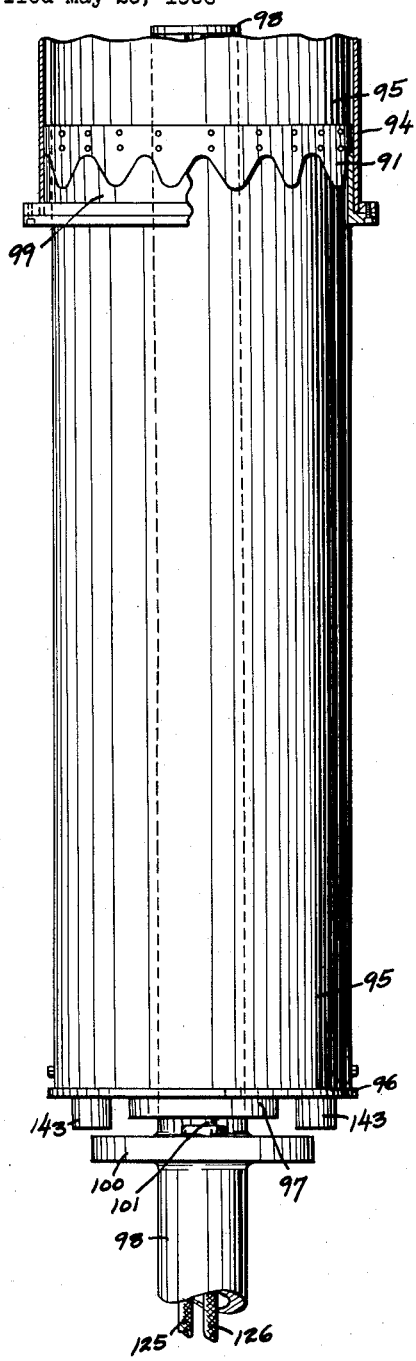
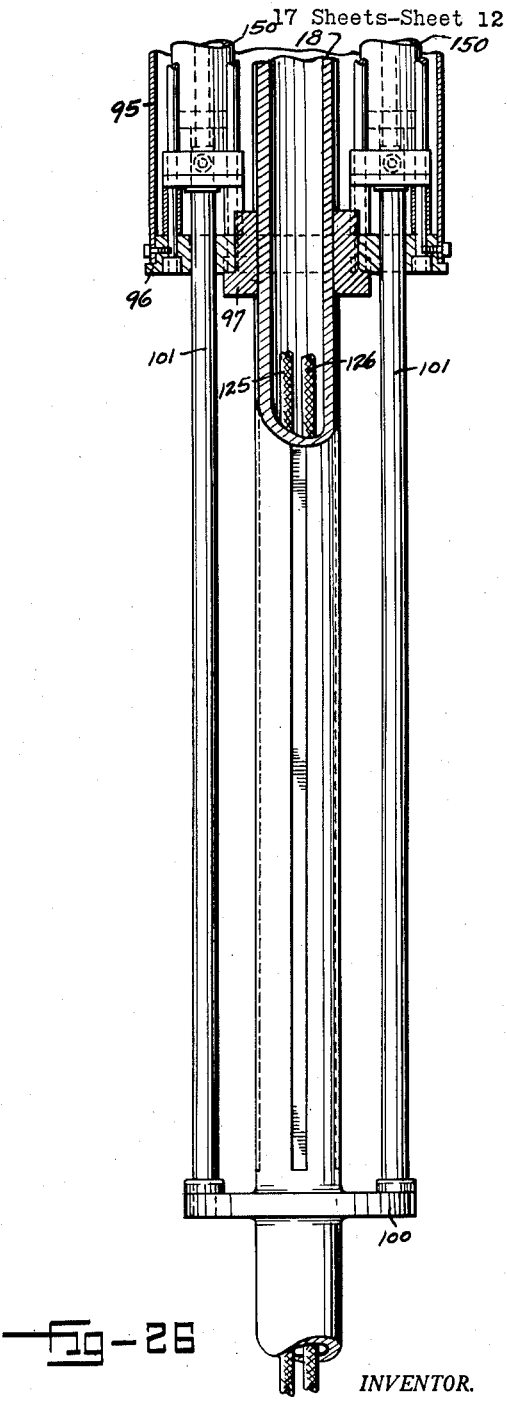

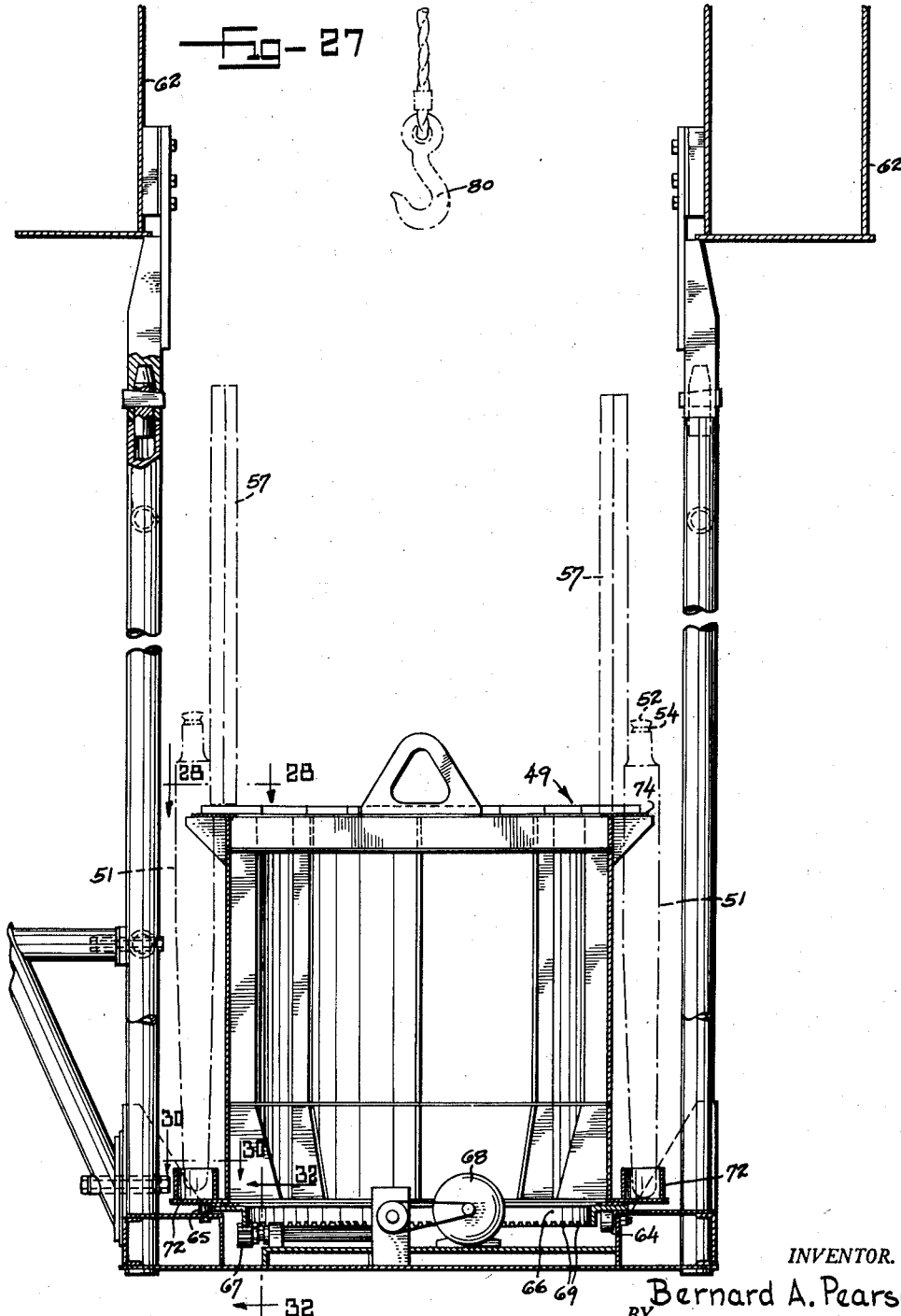

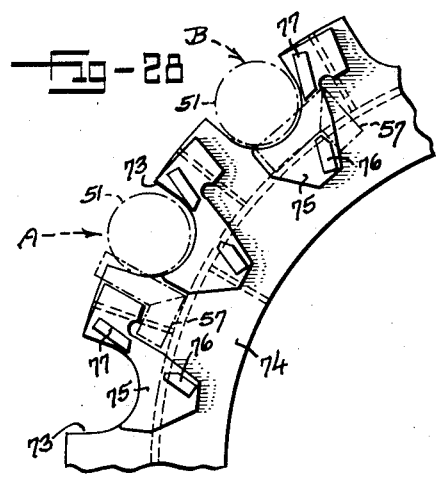
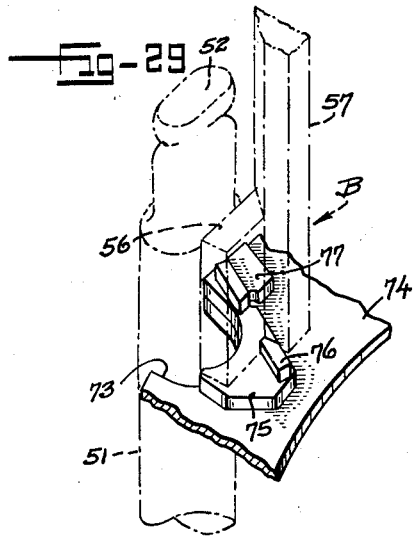
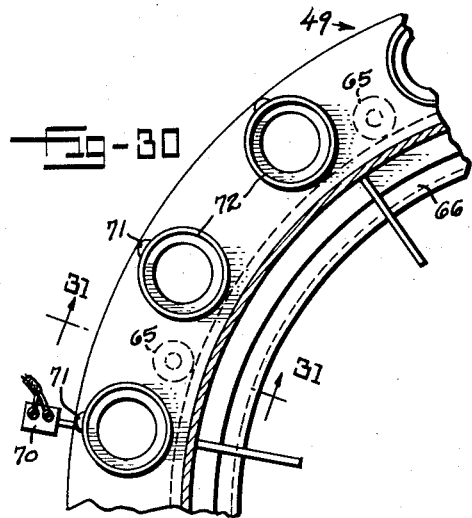
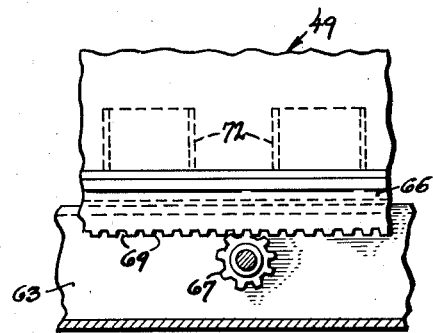
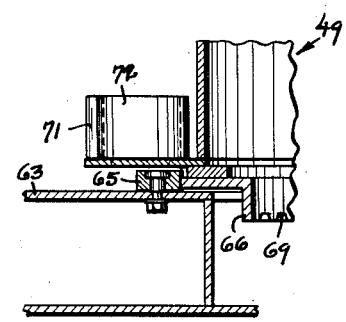
INVENTOR.
Bernard A. Pearson Dec. 13, 1960 B. A. PEARSON 2,964,459
STUD-PULLING CRANE
Filed May 29, 1956 17 Sheets-Sheet 15
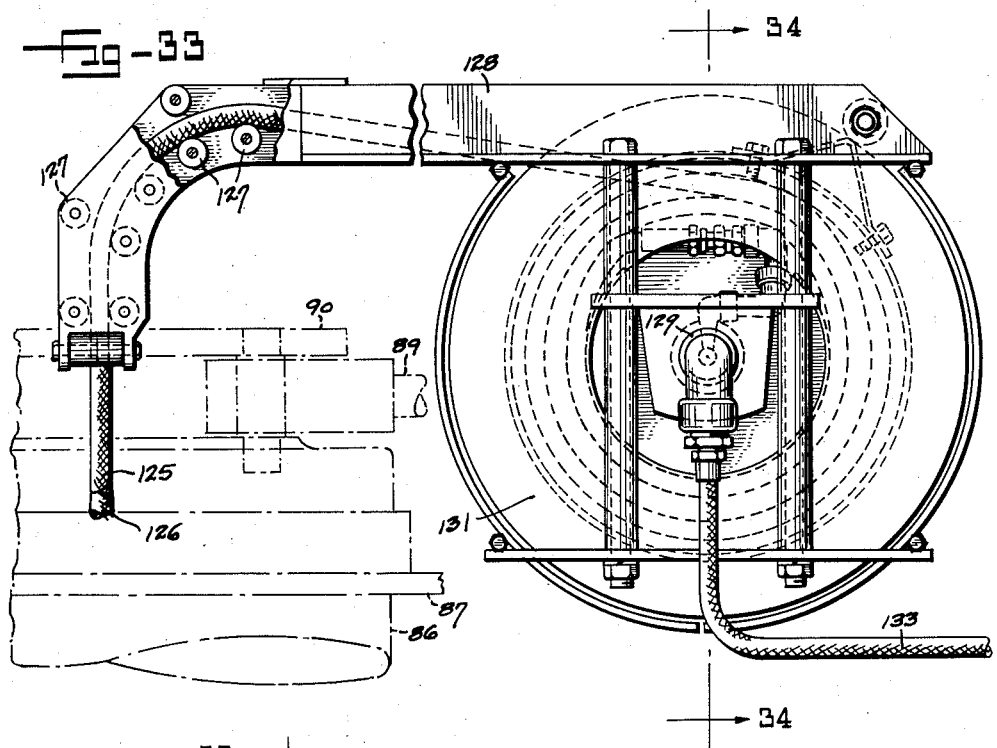
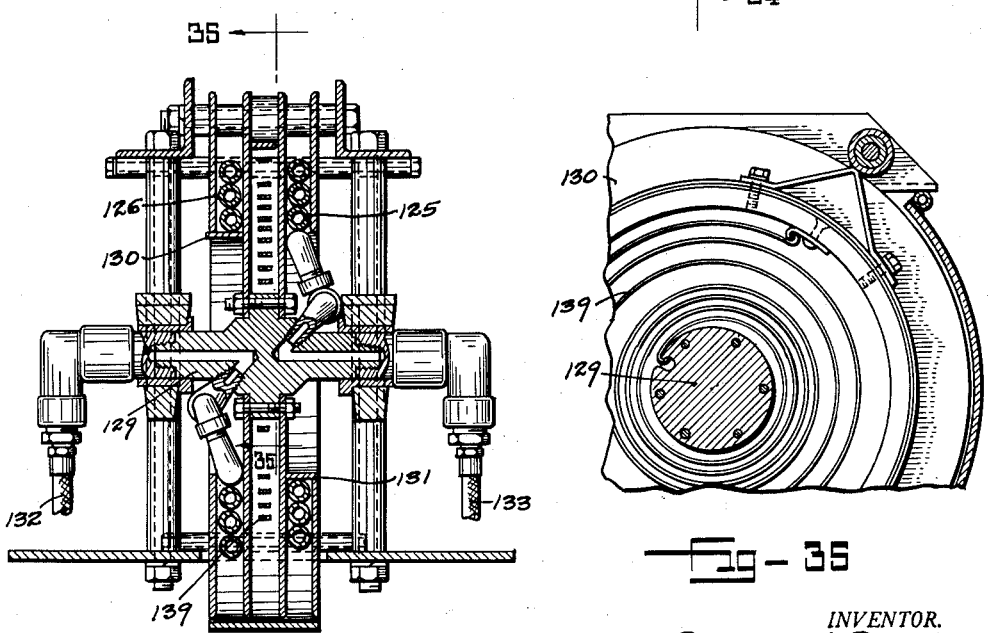
INVENTOR.
Bernard A. Pearson
BY
ATTORNEYS Dec. 13, 1960 B. A. PEARSON 2,964,459
STUD-PULLING CRANE Filed May 29, 1956 17 Sheets-Sheet 16

INVENTOR.
Bernard A. Pearson
BY
ATTORNEYS

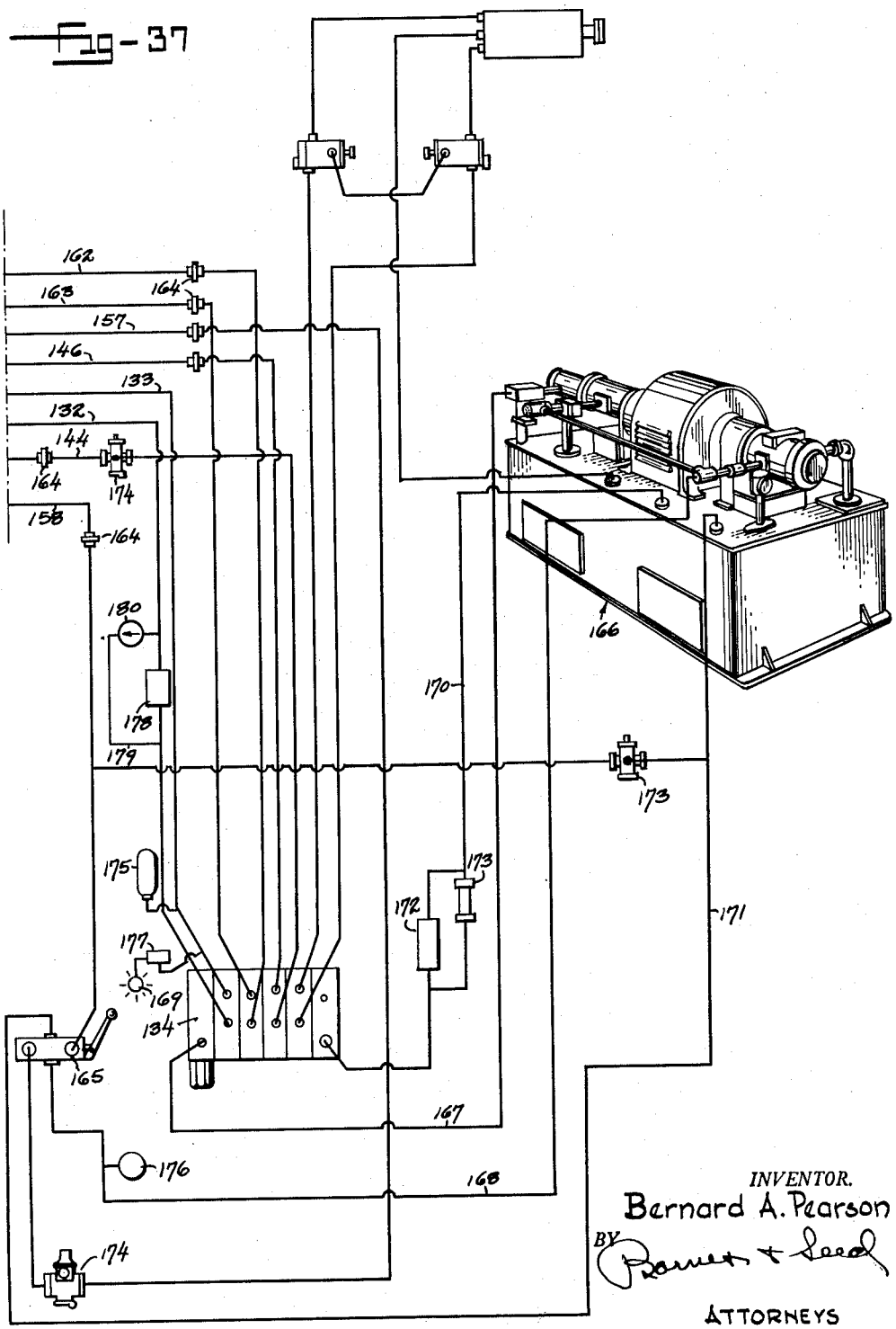

United States Patent Office 2,964,459
Patented Dec. 13, 1960

2,964,459

STUD-PULLING CRANE

Bernard A. Pearson, Seattle, Wash., assignor to Ederer Engineering Co., Seattle, Wash., a corporation of Washington Filed May 29, 1956, Ser. No. 588,121

10 Claims. (Cl. 204—194)

This invention relates to a stud-pulling crane, and especially a crane for pulling the studs which are used to pass current into the carbon anodes of reduction cells employed in the production of aluminum. More especially still the invention pertains to a crane for both (1) pulling the studs, which involves the step of first breaking the stud loose from the encompassing block of carbon, and then lifting the freed stud clear of the carbon block, and (2) replacing the removed stud with a clean stud.

For its general object the invention aims to provide a crane which will perform its intended functions with unusual ease and expedition.

As a further and important object the invention aims to provide a crane which is hydraulic in nature, and which is to say that the energy responsible for performing motions incident to pulling the studs and replacing the same is derived from a controlled pressure flow of oil.

The invention has the yet further important object of devising a stud-pulling crane in which parts of the crane which perform an elevating function in course of raising a pulled stud clear of the carbon block are telescopically associated with one another, thus lowering the head room required by the crane and by such token permitting the latter to be housed in a building of considerably less height than would otherwise be the case, with consequent major reduction in building costs.

With the foregoing objects and advantages in view, and otherwise looking to the provision of a rugged stud-pulling crane which can be serviced with ease, all of which will appear and be understood in the following description and claims, the invention consists in the novel construction and in the adaptation and combination of parts hereinafter described and claimed.

In the accompanying drawings:

Figure 1 is a fragmentary transverse vertical sectional view illustrating a stud-pulling crane constructed to embody the preferred teachings of the present invention, full and dotted lines being employed to indicate the elevating structure in a lowered and a raised condition. Studs shown in this view are portrayed by broken lines.

Fig. 2 is a top plan view of the crane.

Fig. 3 is a fragmentary view of the stud puller proper, shown partly in elevation and partly in section and with the scale appreciably larger than that employed in the preceding views. Incorporated in this view is a showing of a stud.

Fig. 4 is a diagrammatic view showing the quarter-turn motion to which the stud puller admits.

Fig. 5 is a reduced-scale elevational view of the stud.

Fig. 6 is a horizontal sectional view drawn to an enlarged view on line 6—6 of Fig. 5.

Fig. 7 is a fragmentary top plan view of one of the reduction cells with a broken-line illustration of the stud puller shown in position preparatory to pulling a stud.

Fig. 8 is a vertical sectional view of the reduction cell drawn to an enlarged scale on line 8—8 of Fig. 7.

Fig. 9 is a vertical sectional view on line 9—9 of Fig. 8.

Fig. 10 is a fragmentary top plan view of the stud puller proper.

Fig. 11 is a fragmentary vertical sectional view of the stud puller drawn on the jogged section line 11—11 of Fig. 15.

Fig. 12 is an enlarged scale view blowing up the circled detail designated by 12 in Fig. 11.

Fig. 13 is a similar view blowing up the circled detail designated by 13 in Fig. 11.

Fig. 14 is a fragmentary enlarged-scale horizontal section on line 14—14 of Fig. 11.

Fig. 15 is an enlarged-scale horizontal sectional view on line 15—15 of Fig. 11.

Fig. 16 is a fragmentary enlarged-scale vertical sectional view illustrating the lower or chuck end of the stud puller, and with the gripping fingers of the chuck in the positions which the same occupy when the chuck is gripping a stud.

Fig. 17 is a horizontal sectional view on line 17—17 of Fig. 16.

Fig. 18 is a horizontal sectional view on line 18—18 of Fig. 16.

Fig. 19 is a view similar to Fig. 16 showing the gripping fingers of the chuck in an open condition.

Fig. 20 is a fragmentary vertical sectional view on line 20—20 of Fig. 19.

Fig. 21 is an elevational view showing a fragmentary portion of the stud puller's lower end.

Fig. 22 is a horizontal sectional view on line 22—22 of Fig. 20.

Fig. 23 is a horizontal sectional view on line 23—23 of Fig. 20.

Figs. 25 and 26 are each fragmentary elevational views of the stud puller with parts in section, the two views portraying different degrees of telescoping action.

Fig. 27 is a fragmentary vertical sectional view of the rack in which replacement and used studs are stored.

Fig. 28 is a fragmentary horizontal sectional view drawn to an enlarged scale on line 28—28 of Fig. 27.

Fig. 29 is a fragmentary perspective view illustrating much the same structure as that shown in Fig. 28.

Fig. 30 is a fragmentary horizontal sectional view drawn to an enlarged scale on line 30—30 of Fig. 27.

Fig. 31 is an enlarged-scale detail vertical sectional view on line 31—31 of Fig. 30.

Fig. 32 is a fragmentary vertical sectional view on line 32—32 of Fig. 27.

Fig. 33 is a fragmentary elevational view of a hose-carrying reel structure employed in the present invention.

Fig. 34 is a fragmentary vertical sectional view on line 34—34 of Fig. 33.

Fig. 35 is a fragmentary vertical sectional view on line 35—35 of Fig. 34; and

Figs. 36 and 37 are views which, taken together, diagram the hydraulic circuit for the invention.

Figure 24:
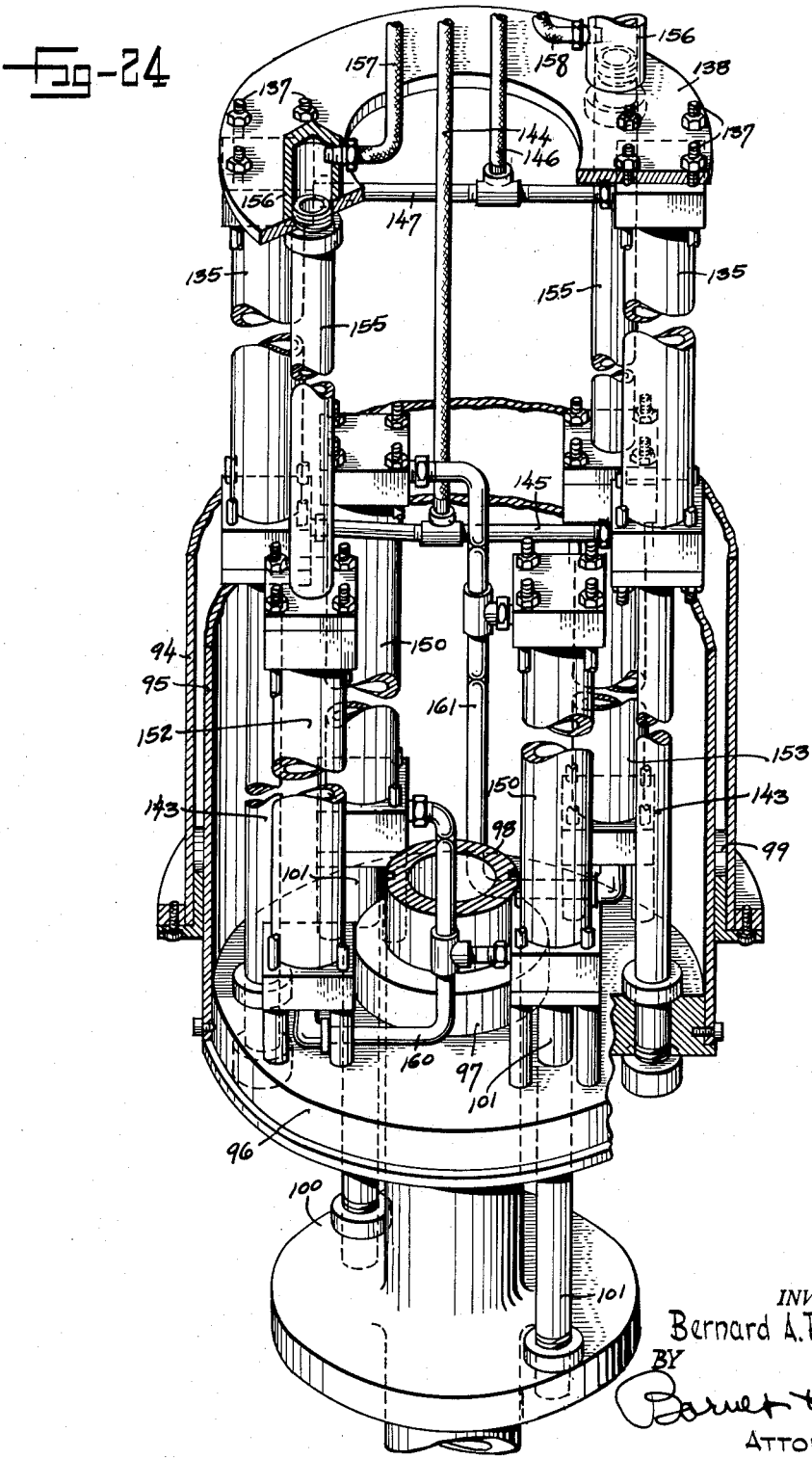
Fig. 24 is a fragmentary perspective view of the upper end of the stud puller.

Before proceeding with a detailed description of the present invention it is believed that clarity in an understanding thereof may be advanced by here cursorily considering the work to be accomplished and generally outlining the structure which I provide for performing such work.

One process in the production of aluminum employs what is known as the Soderberg reduction cell, wherein a block of carbon which serves as an anode has embedded therein a multiplicity of studs. The studs carry current to the block and present exposed upper ends which are clamped to a bus bar. As the reduction process is carried on the lower face of the carbon block is gradually eroded and in compensation thereof, so that the gap between such anode and a complementing cathode will remain constant, the block is mounted for vertical movement. There is a critical level below which the studs must not extend, wherefore it becomes necessary to withdraw the studs as their embedded ends reach this level. In order that the reduction process may not be interrupted it is the practice to have the studs extend to different depths within the carbon block so that current can continue to pass through upper studs as lower studs are removed. The studs have a moderate taper, and the removal procedure is one of first disengaging the clamping agent so as to free the stud from the bus bar, then imposing twisting and drawing forces upon the stud to break the bond between the stud and the hard carbon in which it is embedded, and finally withdrawing the stud by lifting the same free of the block. There is a hard residue crust of carbon upon each stud as it is removed, wherefore the studs must be cleaned before being returned to service. Upon removal of the studs liquid carbon enters the socket to fill the same, this liquid carbon occurring as a covering layer upon the block. A clean replacement stud is now inserted in this socket, albeit with its lower end at a given higher level, and excess liquid carbon is squeezed out from around such stud as the latter is lowered into the socket. The operation is completed by again clamping the applied stud to the bus bar. The stud-investing liquid carbon gradually hardens so as to become an integral part of the carbon block.

In performing the above work of breaking the bond between stud and block, extracting the freed stud, and inserting the replacement stud, the present invention provides a trolley supported by an overhead traveling crane, and carried by the trolley is a stud-pulling unit providing a telescoping leg having upon its lower end a stud-gripping chuck. The leg admits of having a twist imposed thereon, and it is a salient characteristic of the unit that the operations of activating the chuck, twisting the leg, and telescoping the leg are performed hydraulically. The invention provides a rack in which used studs are deposited, and from which fresh studs are drawn.

In the accompanying drawings the anode-forming carbon block in which the studs are embedded is denoted by the numeral 50. One such block is provided for each cell. From an inspection of Figs. 5 through 9, it will be seen that each stud 51 is tapered and at its upper end has a reduced head 52 cut away, as at 53, to furnish diametrically opposite flats the purpose of which is to fit in a correspondingly shaped socket of the chuck and secure the stud against rotation relative to the chuck. Immediately above these flats the heads are notched, as at 54, to receive jaws of the chuck, and below the flats 53 there is provided a flat face 55. An L-shaped extension 57 has its foot 56 seated against and integrally secured to said face 55. The upright leg of this L-shaped extension, when viewed from above, lies angular to the foot and is directed away from the stud in a plane tangent or approximately tangent thereto, and in use is arranged to be clamped against the bus bar. There are two pairs of these bus bars, designated by 58 and 59, for each cell, and the arrangement is one in which the two bars of each pair are placed back-to-back with a plurality of studs being clamped to the outer face of each bar. Viewing a cell in plan (see Fig. 7) and from a vantage point at one end thereof so that the two bars of each pair can be said to be right and left hand bars, it will be seen that the studs in the left hand row are turned approximately 180° from the studs in the right hand row.

The traveling crane of the present invention provides the usual trucks 60 riding on longitudinally extending overhead tracks 61, and has a pair of girders 62 extending transversely between these trucks, the girders being transversely spaced and having the opening which lies therebetween unobstructed other than for a stirrup 63 in which the above-mentioned rack, designated generally by 49, is arranged to seat. This stirrup lies at or about the midwidth of the crane and the seat proper lies well below the girders and carries a set of rollers 64 on which the rack bears. These rollers are journaled to rotate about horizontal axes and are located at spaced intervals on the circumference of a circle taken about the center of the stirrup as an axis, and are complemented by a set of rollers 65 journaled to turn about vertical axes spaced at intervals of the circumference of a circle concentric with and larger than the above-mentioned circle. The rack has an annular base plate 66 which seats upon the rollers 64 and bears by its outer rim against the rollers 65 and at the inner perimeter such plate presents a downturned flange formed upon its lower edge with rack teeth 69. A stirrup-carried gear 67 meshes this rack, and powering the gear is a motor 68. In order that the operator may stop the rack 49 in positions which will assure proper registration with the chuck, there is provided a visual indicator comprised of an electrically-energized signal light (not shown) which is included in a normally open circuit closed by a limit switch 70 (see Fig. 30) engaged by a nodular projection 71 formed upon each of a plurality of cups 72 carried by the rack. These cups, which are each adapted to receive the lower end of a respective stud, occur at the base of the rack and are placed at uniformly spaced intervals of the circumference. At the top of the rack such cups are each complemented by a coaxially placed semi-circular socket 73 cut in an annular head flange 74. As an adjunct to each of said sockets there is welded to the face of the head flange a respective positioning plate 75, and on each of these plates are two positioning lugs 76 and 77. The function of the positioning plates and their surmounting lugs is to engage the sectionally angle-shaped foot portions of the stud extensions 57, and by such engagement localize the rack-carried studs in a selected one of two fixed rotary positions. The shape and placement of such plates and lugs can be best seen from an inspection of Fig. 28 wherein the two positions are shown by dotted lines and will be hereinafter termed Position A and Position B. Consider that part of the foot which bears against and is fixed to the stud as the toe portion and the angular projection thereof as the heel portion. When occupying Position A, said toe is located approximately radial to the center of the rack, and the heel is to the inside. The toe now lies between one end of one positioning plate and the other end of another positioning plate, seating directly upon the flange. When occupying Position B, the stud is turned 90° from the A position in a counter-clockwise direction, placing the toe approximately tangent to a circle taken about the center of the rack and with the heel directed inwardly radial to such center. In this position the foot seats upon a positioning plate 75 and locates the toe between the related two lugs 76 and 77. The significance of these two positions will become apparent in course of describing the functioning of the stud puller, but suffice it to here say that such positions are determined by whether the stud in question is to be applied to a left or to a right hand bus bar. For loading the rack with fresh studs the procedure is to remove the rack bodily and transport the same to and from the loading station, the trolley of the crane being equipped with a hook 80 for performing this function.

Said trolley for the crane is denoted generally by 81, and the track rails therefor are designated by 82, such rails extending transversely of the crane one on one and the other on the other of the two girders 62. A cab 83 for the driver of the trolley is hung from an outrigger extension of the trolley frame 84.

Bolted as at 85 to the frame 84 and in a manner (see Fig. 13) which electrically insulates the same from the frame there is provided an upstanding cylindrical shell 86 open at the top and bottom, and made a rigid part of this shell and projecting well beyond the same at diametrically opposite sides is a surmounting head 87. This head provides a purchase for two opposingly mounted double-acting oil cylinders 88 whose pistons act through connecting rods 89 to impart a quarter turn to a crank ring 90, such ring being fixed to the outer of two telescoping cylinders hung within the cylindrical shell 86. A roller bearing 92 at the bottom of the shell and a thrust bearing 93 at the top provide a rotary journal for said outer cylinder, designated by 94. At the low limit of telescoping travel the inner of said cylinders, denoted by 95, is secured against rotation relative to the outer cylinder by coupling rings 91 and 99 presenting interlocking teeth.

Fitted in the bottom end of the inner said cylinder 95 and secured thereto is a head 96, and fixed in a center opening of this head is a bushing 97 serving as a slide journal for a hollow spindle 98, the spindle having a spline fit in the bushing. The spindle presents a collar 100 at or about its mid-length, and secured to the collar at diametrically opposite sides of the spindle are the lower ends of a pair of piston rods 101.

At the lower end of the spindle there is provided a stud-gripping chuck. The nature of this chuck and the manner of attaching the same to the spindle can be best understood from an inspection of Figs. 16 through 23 wherein it will be seen that a chuck body 103 is secured by bolts 104 to the spindle, with an intervening spider 105. Radiating arms 106 of the spider are caught in registering notches of said body and the spindle. The spider presents an internally grooved hollow neck 107 extending into a head bore of the chuck body, and finding a loose spline connection in these grooves 102 is a set of cross-slats 108 gripped by bolts 109 between a head-piece 110 and a follower 111. The follower presents an upstanding hub, and a piston rod 112 is threaded by its lower end into this hub. The piston 113 which is related to said rod is double-acting and works in an oil cylinder 119 bolted in place within the hollow center of the spindle immediately above the spider.

The oblong socket of the chuck body previously referred to into which the reduced head 52 of the stud is received is denoted by 114, and above this socket is a recess 115 of relatively extended length. The diameter of this recess is appreciably larger than the span across the minor axis of the socket 114, and connecting the side walls of the socket with the side walls of the recess are flanks 116 sloped to an approximate 90° angle. The head-piece 110 occupies the upper end of the recess 115, and there is pivotally suspended from the head-piece a pair of opposed fingers 118 each having at its lower end an inturned jaw 120 arranged to fit the notches 54 of the studs and upon its underside presenting a sloped face 121 conforming to and adapted to ride along the sloping flanks 116 of the recess 115. Pins 122 urged outwardly by a spring 123 act to yieldingly spread the fingers. When the fingers are pushed downwardly by hydraulic action of the piston 113, the sloped flanks of the recess close the jaws upon the stud and it will be apparent that these flanks then lock the jaws upon the stud, taking all lateral thrust so that the piston itself is entirely relieved of stress when pull force is being exerted upon a stud in breaking the bond between the stud and the carbon block of the reduction cell.

Hydraulic fluid for the operation of the piston 113 is fed to opposite ends of the cylinder 119 by flexible hoses 125 and 126, these hoses extending upwardly the length of the spindle into the hollow interior of the cylinder 95, and thence being guided by rollers 127 over a goose-neck 128 to respective spring-loaded reels 130 and 131. A hub 129 which is common to these two reels is drilled to provide oil passages leading to the root ends of the two hoses. Flexible hoses 132 and 133 leading from a multiple unit control valve 134 connect by the usual fittings with said drilled passages. The goose-neck has its inner end, and which is to say the end opposite the reel, boltably secured to the crank ring 90, hence causing the goose-neck and its supported reel to swing bodily in unison with the ring as quarter-turn wrist movements are imparted to the latter.

For the hydraulic activation of the spindle 98 in imparting controlled endwise motion thereto, and for hydraulically activating the cylinders 94 and 95 in the controlled telescoping of the latter, there is provided within the inner of said cylinders two pairs of vertically disposed oil cylinders and one pair of vertically disposed transfer cylinders. Designated by 135, one pair of such oil cylinders are stationary, being placed diametrically opposite one another and having their upper ends anchored, as by bolts 137, to a plate 138 hung from a retainer ring 140. Pistons 142 which work in these cylinders are double-acting and connect by piston rods 143 with the head 96 of the inner of the two telescoping cylinders. A hose 144 connects by branch pipes 145 with the lower ends of both stationary cylinders, and a hose 146 connects by branch pipes 147 with the upper ends of these cylinders. As will, it is believed, be apparent, the function of said stationary oil cylinders is to expand and contract the telescoping cylinders 94 and 95. The second pair of the above-mentioned oil cylinders, denoted by 150, act to impart endwise motion to the spindle 98 and, like the oil cylinders 135, are housed within the inner cylinder 95 and are placed diametrically opposite one another. Cylinders 150 foot upon and are boltably anchored to the head 96, hence move with the latter, and double-acting pistons 151 for these cylinders connect by the referred-to piston rods 101 with the fixed collar 100 of the spindle 98.

In compensation of the vertical travel of which said movable cylinders 150 partake as the latter move with the head 96, pressure oil fed thereto is delivered through the pair of transfer cylinders which are denoted by 152 and 153. Each such cylinder is anchored by its lower end to the head 96 and has fitted therein a piston 159 presenting about its periphery a plurality of through-openings 154 (see Fig. 15), thus permitting oil within the cylinder to flow freely between opposite ends thereof. A respective hollow piston rod 155 extends upwardly from each piston through a suitable end seal and has its upper end anchored to the stationary head plate 138, there connecting by a pipe terminal 156 with a related pressure hose, as 157 and 158. Respective pipe branches 160 and 161 connect with the lower ends of the transfer cylinders, one leading to the lower ends and the other leading to the upper ends of the two movable oil cylinders 150. Each of the hoses 144, 146, 157 and 158 are preferably of a type reinforced by a metal screen, as are hoses 162 and 163 which lead to the inner and to the outer ends, respectively, of the two horizontal oil cylinders 88. Within the length of each of these reinforced hoses there is introduced an electric insulator, as 164 (Fig. 37).

As will be seen from the diagram, each of the two horizontal oil cylinders 88, the stationary vertical oil cylinders 135, and the cylinder 119 for the chucking fingers are controlled by the multiple unit valve 134. An open center 4-way valve 165 controls the movable vertical oil cylinders 150. Hydraulic supply lines leading to said valves from a pressure source 166 are denoted by 167 and 168, and return lines are designated by 170 and 171. Incorporated in the circuit are the usual heat exchanger 172, relief valves 173, and balance valves 174. 175 indicates an accumulator, 176 a pressure gauge, and 177 a pressure switch. This switch, which responds to the pressure within the oil line 133 which leads through hose 125 to the upper end of the oil cylinder 119, closes a normally open electric circuit including a signal light 169, evidencing within the line a pressure at or above a predetermined adequate intensity, say 500#. Contained in the oil line 132 (see Fig. 37) which connects by hose 126 with the lower end of said oil cylinder is a solenoid-operated normally-closed valve 178. This valve closes the line only for out-flow travel of oil. Return-flow oil skirts the solenoid valve by means of a bypass 179 in which there is received a check-valve 180.

The source 166 from which hydraulic energy is derived is carried by and moves with the trolley. The controls therefor, namely the valves 134 and 165, together with controls for each of four electric motors, namely the motor 68 for turning the rack 49, a motor 180 for raising and lowering the hook 80, a motor 181 for moving the trolley along its tracks 82, and a motor 182 for moving the crane proper, are each located within the cab 83.

While I have here shown the rack as occupying a position at or about the crane's mid-width, and which permits the trolley to work from either direction in depositing studs in and drawing studs from the rack, this introduces a clearance problem where a crucible (not shown) for drawing and pouring liquid aluminum is carried by the trolley. In such case the rack is placed so as to occupy a position adjacent one end limit of the trolley's travel, and access to the rack is then had only from the one exposed side. For descriptive purposes, let it be here assumed that this latter situation prevails and that all of the cells which are to be serviced by the crane lie between such rack and the opposite end limit of the trolley's travel. A single crane can effectively service up to thirty-six of the multiple-stud cells illustrated in Figs. 7, 8 and 9, requiring approximately 3 minutes to complete one stud-changing cycle of operation. The several cells are each located with the major axis thereof disposed parallel to the path traveled by the trolley as the latter moves along the rails 82.

Having disengaged the clamp from a stud which is to be replaced, the crane operator, by recourse to a marking gauge within the cab, shifts the crane and the trolley so as to bring the spindle 98 into a position whereat its axial center coincides with that of the stud, and the hydraulic control valves are then operated to telescopically extend the stud puller, causing cylinder 95 to descend until the clutching teeth 91 are brought into mesh with the clutching teeth 99, and the spindle 98 to move downwardly until the head of the stud enters the chuck recess, these operations being the result of feeding oil from the pressure source 166 through hose 146 and branch pipes 147 into the upper end of stationary cylinders 135, and through hose 158 into transfer cylinder 153 and thence by pipes 161 into the head end of the movable cylinders 150. Upon reaching such lowered position oil from the pressure source is supplied through connecting hoses 133 and 125 into the upper end of the oil cylinder 119, whereupon the jaw head 110 moves downwardly within the chuck recess 115 and closes the fingers 118 upon the socketed head 52 of the stud 51 as the sloping faces 121 of said fingers slide along the sloping flanks 116 of the recess. Entrance of the head of the stud into the socket 114 of the chuck body is readily effected in that the fit is moderately loose, and it is for this reason that the spline connection as between the cross-slats 108 and the grooved neck 107 of the spider 105 is quite "sloppy," insuring at all times a snug fit of the jaws 120 upon the notched head of the stud. It is here reiterated that the only pressure required in order to maintain the grip of the chuck jaws upon the stud is the effort necessary to hold the fingers in their depressed position, all lateral thrust load being carried to the sloping flanks 116. To now break the bond between the stud and the carbon block, the spindle is subjected to a twisting force, this twist, which is in a clockwise direction, being imparted to the crank ring 90 by oil fed under pressure through hoses 163 to the outer ends of the horizontal cylinders, being passed to the chuck by the clutching teeth 91—99 and the spline connection to the spindle from the bushing 97 which is boltably secured to the lower head 96 of the inner cylindrical shell 95.

Figure 36:
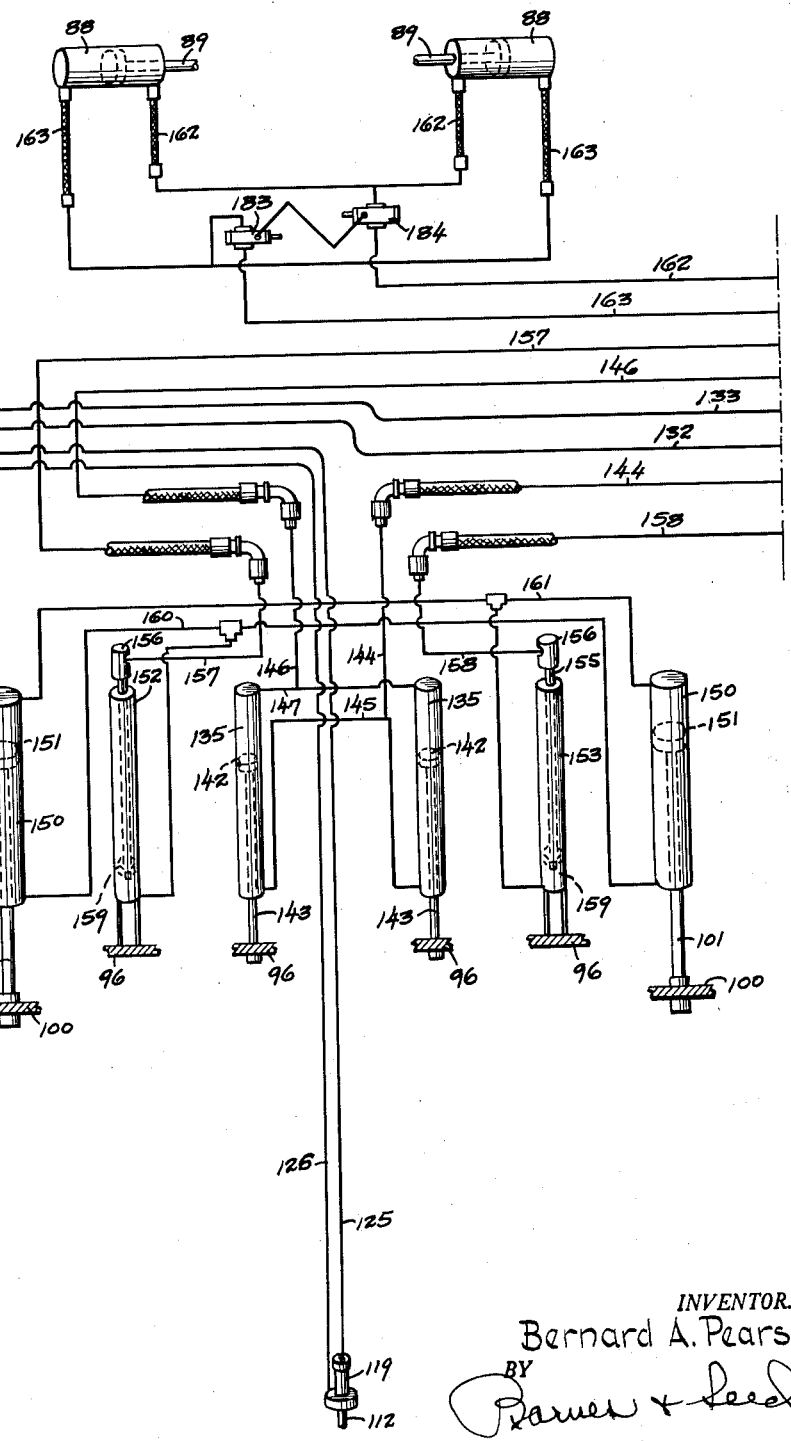

It is important to note that were the pistons of the horizontal cylinders 88 permitted to twist the crank ring without having the clutching teeth 91—99 in engagement with one another, the oil cylinders 135 and 150 would become damaged due to the direct transfer thereto of torque from the head ring 138. To preclude such from occurring I introduce as a safety feature the two valves 183 and 184 which are shown diagrammatically in Fig. 36. These valves are normally closed and in this condition isolate the cylinders 88 from the supply lines 162 and 163. The construction and hook-up of these two safety valves 183 and 184 is such that oil supplied under pressure thereto either through the line 162 or the line 163, when the valves are closed, is caused simply to flow from one valve to the other valve and thence returns by the other pipe 162 or 163, as the case may be, to the storage tank, by-passing the cylinders 88 and maintaining within the latter a hydraulic lock against motion of the concerned pistons. For opening said safety valves so that oil may flow to the cylinders and responsively twist the crank ring, there is provided a normally-open limit switch 185 mounted on the cylindrical member 94 at its lower end and caused to be closed by an activating arm 186 engaged by the clutching teeth 91 as the latter are brought into meshing engagement with the teeth 99. This activating arm is pivotally mounted and projects through an opening in the wall of the cylindrical member 94 into the lower extreme of the path travelled by the teeth 91. The limit switch is the closing instrument for a normally open electric circuit (not shown) including solenoids for shifting valves 183 and 184 into positions whereat the cylinders 88 are brought into communication with the supply lines 162 and 163.

Upon breaking the bond between a stud and the carbon which invests the same, the telescoping members are contracted to withdraw the stud from its socket and lift the same in a degree sufficient to bring the low point of the transported stud moderately above the level of the cups 72 of the stud rack 49, and the trolley is then shifted along the rails 82 until the stud lines up axially with a receiving stall of such rack.

As here shown, the rack has eighteen stud-carrying stalls, and when freshly charged all but one of these stalls carries a clean stud. This empty stall is the receiving stall in which a used stud is to be placed, and for this purpose is brought into a position at the near side of the rack in the transverse vertical plane occupied by the spindle. Having lowered the stud into the receiving stall, then supplied oil under pressure through hose 126 to lift the chuck jaws so as to free the stud, and then again raising the spindle in a moderate degree, the operator energizes motor 68 to bring a selected fresh stud below the chuck and the operation is then reversed to cause the chuck to grip the fresh stud. The latter is now carried to and inserted in the cavity of the carbon block from which the used stud was removed, albeit at a higher level, following which the stud extension 57 is clamped to the related bus bar. Liquid carbon now invests the fresh stud and, as previously stated, gradually hardens. In the described operation of returning a fresh stud to the carbon block, whether the stud drawn from the rack is one which, in its stall, occupies the described "A" position or the described "B" position is determined by whether the stud is to be clamped against a left hand or against a right hand bus bar. If the former is the case, an "A" position stud is selected. Such stud, after the operator has extended the telescoping cylinders to bring the clutching rings into engagement, is rotated 90° in a clockwise direction. This perforce brings the outer face of the extension 57 into a position which will cause the same to bear against said left hand bus bar. If the stud is one which is to be clamped against a right hand bus bar, a "B" position stud is selected, there being no need in such instance to turn the stud in that the same is already so positioned that the outer face of its extension 57 will bear against the right hand bus bar.

The significance of the solenoid-operated valve 178, shown in Fig. 37, should be here pointed out. This is another safety feature designed to obviate an unintentional release of the chuck jaws, as could occur should the operator accidentally move the control handle which supplies oil under pressure to the lower end of cylinder 119, while the stud puller is in transit moving a stud, the weight of which is 450#, between the rack and a carbon block. This arrangement is one which requires activation by the operator of a switch (not shown) closing an electric circuit including the solenoid for said valve 178, such closing of the switch being performed simultaneously with the operation of the hydraulic control handle.

It is thought that the stud puller of the present invention and the manner of its operation will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In an aluminum reduction plant having multiple reduction cells each of which employs a plurality of vertically disposed current-conducting studs, said studs having their lower ends set into a carbon block and having their upper ends removably clamped to a bus bar, the studs each presenting a head which is non-circular in section and having a crown portion of said head undercut wtih V-slots in each of the opposite sides thereof, the combination with said cells and their studs of a traveling crane mounted for overhead movement above said cells, a trolley carried by the crane and movable transversely thereof, a vertically disposed cylindrical shell carried by said trolley, a first cylinder member journaled within the shell for rotation about the center of the latter as an axis and secured against endwise motion with respect thereto, a second cylinder member journaled for endwise sliding movement within the first cylinder member, means operatively associated with said first and second cylinder members acting to hold said second cylinder member against rotation with respect to the first cylinder member when the latter reaches its low limit of travel, a spindle journaled for endwise sliding movement within the second cylinder member and held against rotation relative thereto, a chuck upon the lower end of said spindle having a downwardly facing socket formed in mating correspondence with said non-circular head of the stud and, above and communicating with the socket, presenting a recess of expanded width connecting with the side walls of the socket by sloping flanks, the crown portion of the stud head projecting into said recess, chuck jaws received for vertical motion within the recess with lower face portions thereof riding along said sloping flanks and by action of the latter as the jaws move downwardly within the recess caused to close upon and engage in the slots of the stud head, power means operatively associated with the chuck jaws for raising and lowering the chuck jaws, means yieldingly spreading said jaws so that the latter will open in response to said raising of the jaws, power means operatively associated with the crane and the trolley for regulating the movement of the crane and the trolley so as to bring the socket of the chuck into vertical registration with the head of a selected stud which is to be pulled, and power means operatively associated with the two cylinder members and the spindle for telescoping the two cylinder members and the spindle so as to raise and lower the chuck and for turning the first cylinder member so as to twist the chuck.

2. Structure according to claim 1 in which the power means for telescoping the two cylinder members and the spindle comprises two pairs of oil cylinder-and-piston combinations housed within the second cylinder member, one pair of said oil cylinders taking a purchase from the first cylinder member and having the pistons thereof connecting by respective piston rods with the second cylinder member, the second pair of said oil cylinders taking a purchase from the second cylinder member and having the pistons thereof connecting by respective piston rods with a collar fixed to the spindle, means being provided for delivering oil under pressure to either end of either pair of said oil cylinders selectively.

3. Structure according to claim 2 in which the means for delivering oil under pressure to the second pair of said oil cylinders comprises two transfer oil cylinder-and-piston combinations each of which has its cylinders taking a purchase from the second cylinder member and having its pistons connecting by hollow piston rods with the first cylinder member, the oil under pressure being fed through the hollow piston rods into the transfer cylinders and thence from one transfer cylinder into the upper ends and from the other transfer cylinder into the lower ends of the second pair of said oil cylinders.

4. Structure according to claim 1 in which the means for holding the second cylinder member against rotation relative to the first cylinder member comprises ring members with intermeshing clutch teeth one ring member carried internally by the first cylinder member and the other ring member carried externally by the second cylinder member.

5. In combination with transversely extending spaced girders of an overhead traveling crane having track rails running longitudinally of each of said girders, a trolley, tracking on said track rails, a stud puller depending from the trolley and upon its lower end presenting a chuck having a downwardly facing socket formed in mating correspondence with the head of a stud which is to be pulled, means for removably securing the head of the stud within said socket, a rack suspended from the crane in the general path traveled by the stud puller as the same moves with the trolley and having a multiplicity of stalls for the storage of studs, and power means operatively associated with the rack for rotating the rack so as to bring a selected one of the stalls into a position whereat, upon moving the trolley above the rack, the chuck of the stud puller exactly registers with a stud stored in said selected stall.

6. Structure according to claim 5 in which means are provided by the stalls of the rack engaging the studs stored therein to localize the stud in a selected one of two rotary positions.

7. Structure according to claim 5, power means operatively associated with the stud puller being provided for twisting the stud puller so as to turn the chuck through a substantial 90° arc, the studs each having an upward extension which is adapted, in the use of the stud in a reduction cell, to have one face thereof clamped against a selected one of the exposed faces of two bus bars placed back-to-back, said extension having a foot of angular plan configuration of which the toe portion is secured to the stud proper and of which the heel forms a base from which the extension is carried upwardly as a prolongation thereof, the means provided by the rack to localize the studs in a selected one of two rotary positions being such as permits a stud occupying one of said two rotary positions to be transported by the stud puller to the reduction cell and there clamped against one of said bus bars without turning the stud, and such as permits a stud occupying the other of said two rotary positions to be transported by the stud puller to the reduction cell and there clamped against the other of said bus bars after turning the stud through the 90° arc to which the stud puller admits.

8. Structure according to claim 4 in which the power which turns the first cylinder member so as to twist the chuck is hydraulic, and having a means operatively associated with said power means permitting the first cylinder member to be turned only when the clutch teeth are in mesh.

9. In combination with transversely extending spaced girders of an overhead traveling crane having track rails running longitudinally of each of said girders, a trolley tracking on said track rails, a stud puller depending from the trolley and upon its lower end providing means adapted to releasably grip the head of a stud which is to be pulled, power means operatively associated with the gripping means for operating said gripping means, a rack suspended from the crane in the general path traveled by the stud puller as the same moves with the trolley and having a multiplicity of stalls for the storage of studs, and power means operatively associated with the rack for rotating the rack so as to bring a selected one of the stalls into a position whereat, upon moving the trolley above the rack, the stud-gripping end of the stud puller exactly registers with a stud stored in said selected stall.

10. In an aluminum reduction plant having multiple reduction cells each of which employs a plurality of vertically disposed current-conducting studs, said studs having their lower ends set into a carbon block and having their upper ends removably clamped to a bus bar, the studs each presenting a head having undercut V-slots on opposite sides thereof, a traveling crane mounted for overhead movement above said cells, a trolley carried by the crane and movable transversely thereof, a stud puller suspended from the trolley and at its lower end providing a chuck body, said chuck body having a downwardly facing socket and providing a recess of expanded width above the socket connecting with the side walls of the socket by sloping flanks, the head of the stud being received in said socket with its slotted portion projecting into said recess, chuck jaws mounted for vertical motion within the recess with lower face portions thereof riding along said sloping flanks and by action of the latter as the jaws move downwardly within the recess caused to close upon and engage in the slots of the stud head, said jaws being held against rotation relative to the chuck body, the mounting for the chuck jaws including a spider boltably clamped between the chuck body and a spindle, with said spider providing a hollow neck depending into the upper end of the recess and formed internally with a plurality of spline grooves, an oil cylinder secured within the spindle to occupy a position above the spider, a set of cross-slats having a spline fit in said grooves and gripped between upper and lower head-pieces of which the former is connected to a piston working in the cylinder and of which the latter extends into the upper end of the recess, the jaws being pivoted at their upper ends to said lower head piece, means for raising and lowering the chuck jaws within the recess, means yieldingly spreading said jaws so that the latter will open in response to said raising of the jaws, means for regulating the movement of the crane and the trolley so as to bring the socket of the chuck into vertical registration with the head of a selected stud which is to be pulled, means for lowering the chuck body onto the head, means for elevating the chuck body, and means for twisting the chuck body, the face portions of said chuck jaws which ride along said sloping flanks closely fitting the flanks when the jaws occupy their lowered stud-gripping position, the slope of said flanks being at least 45° from the vertical.

References Cited in the file of this patent

UNITED STATES PATENTS

| | | |
|---|---|---|
| 660,477 | Wellman et al. | Oct. 23, 1900 |
| 777,534 | Von Philp | Dec. 13, 1904 |
| 1,407,005 | Sommer | Feb. 21, 1922 |
| 1,828,523 | Dekker | Oct. 20, 1931 |
| 1,836,444 | Carnahan | Dec. 15, 1931 |
| 2,224,739 | Manfredini | Dec. 10, 1940 |
| 2,709,570 | Henry | May 31, 1955 |
| 2,822,177 | Tripp | Feb. 4, 1958 |

FOREIGN PATENTS

| | | |
|---|---|---|
| 478,950 | Germany | July 6, 1929 |
| 1,070,329 | France | July 22, 1954 |